March 24, 1959     W. N. POUNDSTONE     2,879,049
ADJUSTABLE ARM FOR A ROTARY CUTTING HEAD
Filed July 28, 1955     2 Sheets-Sheet 1
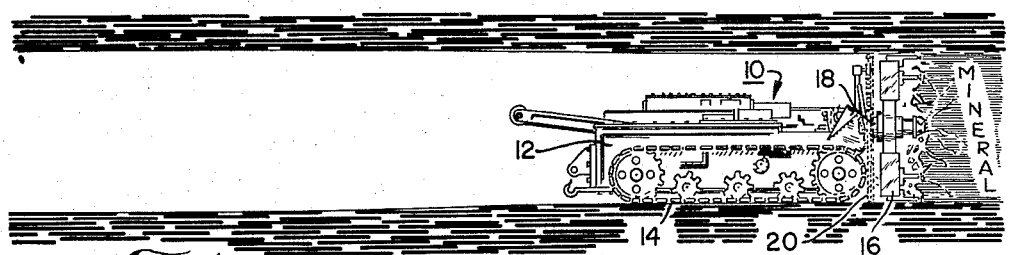
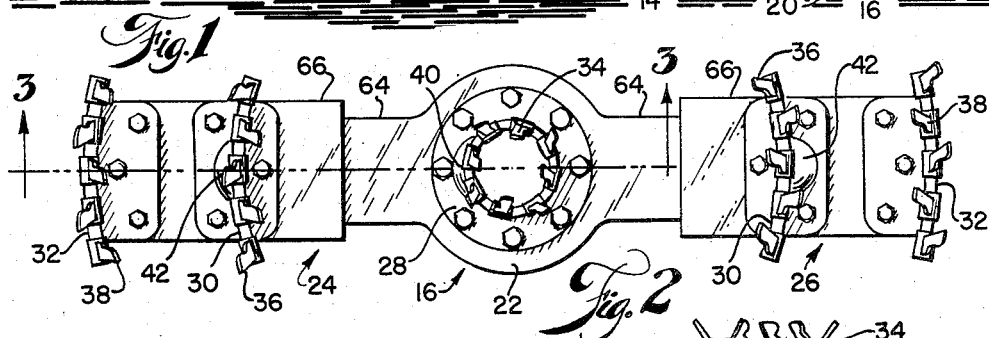
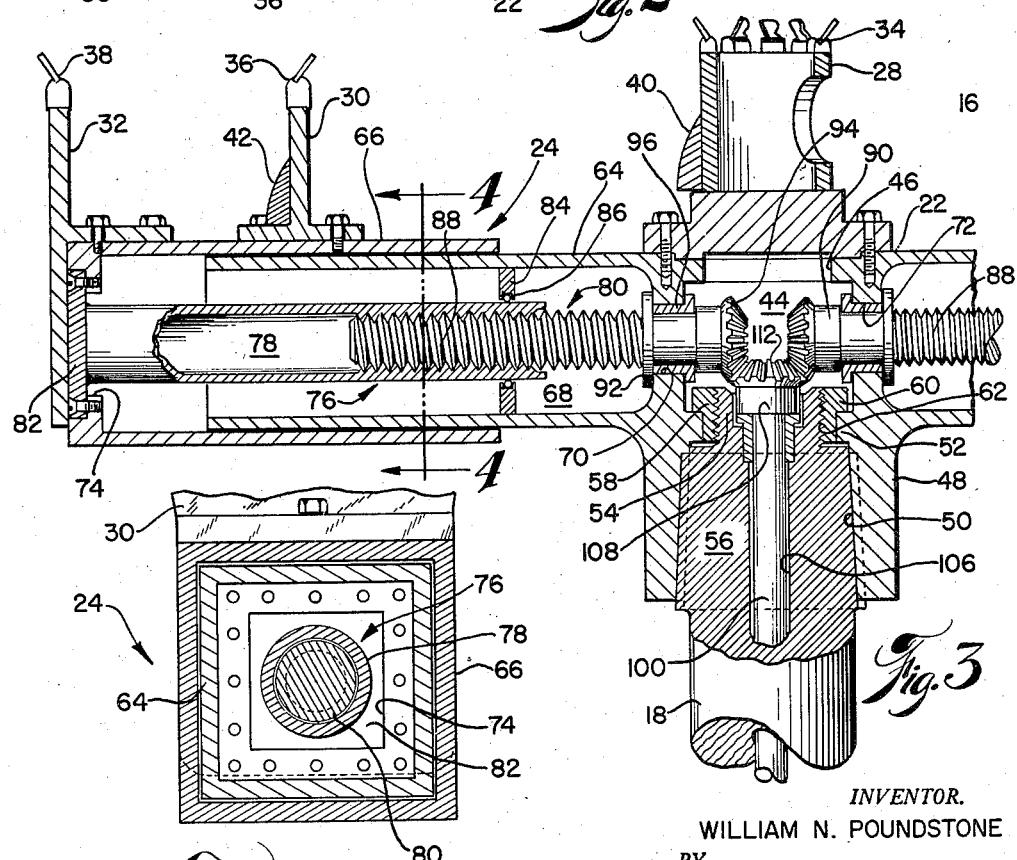
INVENTOR.
WILLIAM N. POUNDSTONE
BY Stanley J Price March 24, 1959   W. N. POUNDSTONE   2,879,049
ADJUSTABLE ARM FOR A ROTARY CUTTING HEAD
Filed July 28, 1955   2 Sheets-Sheet 2
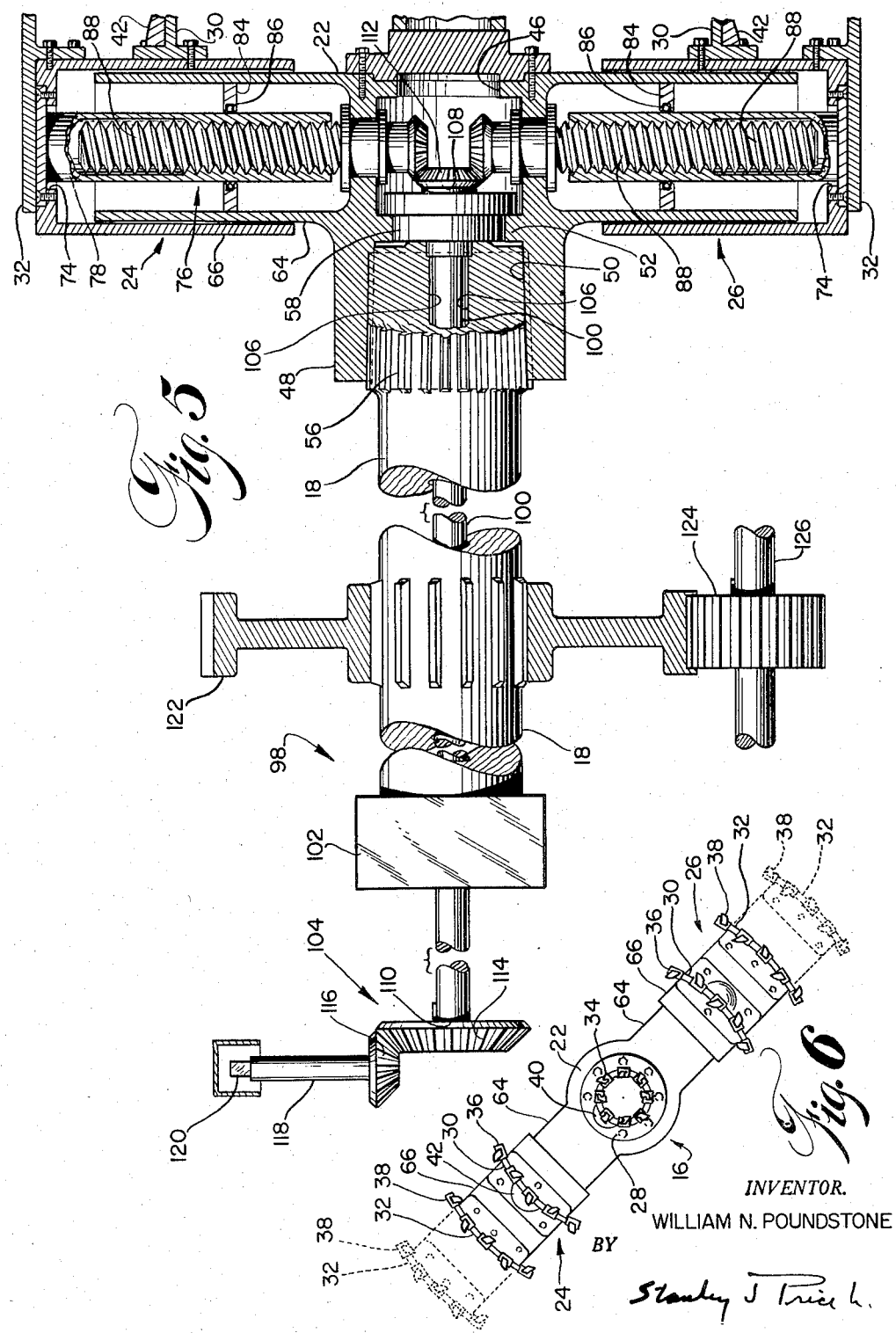
INVENTOR.
WILLIAM N. POUNDSTONE
BY

United States Patent Office 2,879,049
Patented Mar. 24, 1959

2,879,049

ADJUSTABLE ARM FOR A ROTARY CUTTING HEAD

William N. Poundstone, Morgantown, W. Va., assignor to Consolidation Coal Company, a corporation of Pennsylvania Application July 28, 1955, Serial No. 525,053

4 Claims. (Cl. 262—7)

This invention relates to an improved rotary cutting head adapted to be used with a continuous mining machine of the general type that cuts circular kerfs in a vertical face of mineral and more particularly to a rotary cutting head having adjustable arms.

Among the many types of machines used to continuously remove coal or other mineral from a seam or vein, there is a type of machine generally designated as the McKinlay mining machine. This machine has a frame mounted on treads which permits the machine to tram or continuously advance into the seam as the mineral is removed. The frame is so constructed that the dislodged mineral is conveyed towards the rear of the machine by means of a longitudinal central conveyer system. The machine has a pair of spaced rotatable drive shafts extending horizontally from the front end of the housing and rotatable cutting heads secured to the front end of each of the drive shafts. The rotatable cutting heads are adapted to rotate in a plane parallel to the vertical face of the mineral seam. The cutting heads have arms extending radially therefrom with a plurality of cutter bits secured normal to the arms at their radial end portions and a centrally positioned core burster. The rotary cutting heads cut a pair of overlapping circular entries into the mineral seam. Horizontal cutting means positioned tangent the top and bottom of the circular entries remove the cusps therebetween to form a single elliptical entry into the mineral seam.

One of the problems encountered with a machine of this type is its inability to retract or back out of the entry after a predetermined cut has been completed. If the operator during the backing out procedure deviates in a slight degree from the same path or course used in making the entry, the radial arms of the rotary cutting head bind against the entry side wall and cause serious damage to the machine especially the outside cutting bits and tool holders. This difficulty results from the very slight clearance between the radial edges of the arms and the entry side wall. Several attempts have been made to solve this problem in the past. One such attempt was to provide the radial arms with hinge connections adjacent the rotary cutting head hub portion. When it was desired to retract the machine from the entry, the operator first retracted the machine a short distance with the arms extended. Then the hinge locking mechanism had to be disconnected or removed. To do so, it was necessary for the operator to go to the front of the machine to manipulate the locking mechanism which was positioned on the front face of the rotary cutting heads. This placed the operator between the face of uncut mineral and the front of the mining machine and exposed him to extremely dangerous conditions.

Another problem encountered with this type of mining machine was the absence of flexibility in the radial dimension of the arm of the rotary cutting heads. Since the arms of the rotary cutting head have a fixed dimension, the vertical dimension of the elliptical entry was also fixed. Thus, when entries were made in seams of mineral having high sulfur intrusions adjacent the upper or lower horizontal boundary of the seam, it was not possible to leave the mineral with the high sulfur in place because of this fixed dimension of the rotary cutting head. Also, in the event the vertical dimension of the seam would decrease below the diametrical dimension of the rotary cutting head during a cut, the operator was compelled to remove a portion of the adjacent unwanted slate or waste mineral. In doing so the relative quality of the mined mineral and the relative strength of the entry roof were adversely affected.

Another undesirable feature of the fixed dimension rotary cutting head was the inability of the machine to retract quickly when an unsafe condition developed in the entry. For example, if the operator, during the cutting of an entry, observed the first signs of roof failure prior to a fall, it was not possible for him to retract the machine from the entry prior to the fall because of the extended radial arms. Thus the machine would be covered by the fall, and recovery of the machine would be both hazardous and expensive.

My new and improved rotary cutting head solves all the problems heretofore discussed and also offers many added advantages not heretofore known in the art of continuous mining.

Accordingly, an object of this invention is to provide a mining machine that is maneuverable in operation and capable of removing desired quantities of mineral from a mineral seam.

Another object of this invention is to provide a mining machine that can be easily retracted from an entry.

Another object of this invention is to provide a mining machine which is capable of varying the size of the entry while in continuous operation.

Another object of this invention is to provide a rotary cutting head with radially adjustable arms.

Another object of this invention is to provide relatively dust free means to adjust the radial dimension of the rotary cutting head arms.

Another object of this invention is to provide a rotary cutting head that is efficient in operation, economical and sturdy in construction, and relatively simple to assemble and maintain.

These and other objects and advantages of this invention will be more completely disclosed and described in the following specification, the accompanying drawings, and the appended claims.

Figure 1 is a view in side elevation of a mining machine as it dislodges minerals from a mineral seam;

Figure 2 is a view in front elevation of a rotary cutting head that is rotatably secured to the front of the mining machine;

Figure 3 is a fragmentary sectional plan view taken along the line 3—3 of Fig. 2 showing the details of the mechanism operable to vary the radial dimension of the rotary cutting head arms;

Figure 4 is a view in section taken along the line 4—4 in Fig. 3;

Figure 5 is a detail of the main drive shaft and the arm radial dimension control;

Figure 6 is a view in front elevation of the rotary cutting head similar to Fig. 2 with the arms in the retracted position shown by solid lines and the arms in the extended position shown by dotted lines.

Referring to the drawings in detail and particularly Figs. 1 and 2, there is shown a continuous mining machine 10 having a frame member 12 mounted on a pair of longitudinally positioned treads 14. The treads 14 permit the machine 10 to move forward into the mineral seam as the mineral is removed and also to move in a reverse direction when it is desired to retract or back out of an entry. A pair of rotary cutting heads 16 are secured to rotatable drive shafts 18 extending horizontally from the front of the frame 12. The rotatable drive shafts 18 are in the same horizontal plane and are spaced from each other so that, upon rotation, the rotary cutting heads 16 will cut two overlapping circular entries in the mineral seam. Cutter chains 20 located adjacent the roof and floor of the entry cut and remove the cusps between the circular entries made by the pair of rotary cutting heads 16 and shape an elliptical entry in the mineral seam.

The rotary cutting head 16 as shown in Fig. 2, has a hub portion 22 and a pair of radial arms generally designated by the numerals 24 and 26. A core burster 28 is centrally positioned on the front face of the hub portion 22 and is adapted to rotate axially therewith. Since both of the arms 24 and 26 are similar in construction, similar numerals will be given to similar parts on each arm. The arms 24 and 26 are generally rectangular in transverse section and each has a pair of tool holders designated as inner tool holder 30 and outer tool holder 32 extending forwardly therefrom. The core burster 28 has cutter bits 34 secured to the front edge thereof which are operable to cut an inner annular kerf in the mineral face. Likewise, the tool holders 30 and 32 each have respective cutter bits 36 and 38 secured to their front edge which are operable to cut intermediate and outer annular kerfs respectively in the mineral face. The core burster 28 has an eccentric side wall portion 40 which is operable to burst and dislodge the mineral between the inner kerf and the intermediate kerf. Similarly the inner tool holder 30 has a burster portion 42 on its side wall that is operable to burst and dislodge the mineral between the intermediate and outer kerfs.

Referring now in detail to the rotary cutting head 16 as shown in Fig. 3 the hub portion 22 has a central cavity or chamber 44 therein with a front wall opening 46 and an annular collar 48 extending rearwardly therefrom. The collar 48 has a conical shaped inner wall 50 with spline depressions therein. A shoulder portion 52 extends inwardly from the collar 48 adjacent the hub portion cavity 44. The rotatable drive shaft 18 which extends horizontally from the machine frame 12 has a threaded end portion 54 of reduced diameter and a conically shaped and splined portion 56 adjacent the end portion 54. The rotatable drive shaft 18 is positioned in the collar 48 with the end portion 54 projecting into the hub cavity 44 beyond the shoulder 52 and the shaft splined portion 56 mates with the spline depressions in the collar inner wall 50 so that the rotary cutting head 16 is non-rotatably secured to the rotatable drive shaft 18. An annular cap member 58 having a flanged portion 60 and internally threaded wall 62 is threadably secured to the shaft 18 with a cap flange portion 60 abutting the front face of the shoulder 52. The cap member 58 secures the rotary cutting head 16 to the rotatable drive shaft 18.

The arms 24 and 26 extend radially from the hub portion 22 each having a body portion 64 and a sleeve portion 66. The body portion 64 is integral with the hub portion 22 and has a central longitudinal passageway 68 therethrough. The hub portion 22 has side wall apertures 70 and 72 which connect the respective body portion passageways 68 with the hub portion cavity 44. The arm body portion 64 is generally rectangular in transverse section and the sleeve portion 66 is also rectangular in transverse section and has an inner dimension slightly larger than the outer dimension of the body portion 64. The sleeve portion 66 has inwardly extending flanges 74 adjacent the outer radial end portion. The sleeve members 66 are slidably positioned over the outer radial end of the body portion 64 and are movable longitudinally thereon.

Adjustable means generally designated by the numeral 76 is coaxially positioned within the body portion passageway 68 and is operable to both extend and retract the sleeve portion 66 on the body portion 64. The adjustable means 76 also functions to maintain the sleeve 66 at a desired radial distance from the hub portion 22 and comprises an internally threaded tube 78 and an externally threaded shaft 80. The tube 78 has a rectangular plate 82 secured at one end normal to the longitudinal axis thereof. The tube 78 extends into the sleeve 66 along its central longitudinal axis and the plate 82 is secured to the sleeve flanges 74 by means of screws or the like. A guide member 84 having a central aperture therethrough is positioned within the body portion passageway 68 to both support and align the tube 78 therein. An annular seal ring 86 is positioned within the guide member aperture and prevents dust or mineral fines from entering the inner portion of the arm body portion 64. The externally threaded shaft 80 has its threaded end portion 88 threadably secured in the internally threaded tube 78 and its other end portion 90 projecting through the hub portion side wall aperture 70 into the hub portion cavity 44. Threaded shaft 80 has a flanged portion 92 abutting the outer side wall of the hub portion 22.

The flanged portion 92 limits the inward movement of the shaft 80. A bevel type gear 94 is fixed to the shaft end portion 90 and limits the outward movement of the shaft 80. A sleeve bearing 96 surrounds the shaft 80 adjacent the hub portion side wall aperture 70. Thus it will be seen that upon rotation of the shaft 80 in one direction the tube 78 will move on the shaft 80 toward the hub portion 22 and in turn the tube 78 will move the arm sleeve portion 66 in the same direction thus decreasing the radial dimension of the arm 24. Conversely, if the shaft 80 is rotated in the opposite direction, the tube 78 will move away from the hub portion 22 and increase the radial dimension of the arm 24. Also, if the shaft 80 is not rotating in either direction, the radial dimension of the arm 24 will remain stationary.

In order to remotely control the radial dimension of the arms 24 and 26 a positioning means 98 is provided which is shown in Figs. 3 and 5. The positioning means comprises a connecting shaft 100, a clutch mechanism 102 and a crank mechanism 104. The connecting shaft 100 is rotatably positioned in a longitudinal passageway 106 in the main rotatable drive shaft 18. The connecting shaft 100 has an end portion 108 projecting into the hub portion cavity 44 and another end portion 110 connected to the crank mechanism 104. The shaft end portion 108 has a bevel gear 112 fixed thereto which operatively meshes with the bevel gear 94 on each of the externally threaded shafts 80. Thus, through the gear connections each of the shafts 80 will rotate at the same speed as the connecting shaft 100. With this type of gear arrangement, both of the sleeves 66 will be equidistant from the hub portion 22.

The clutch mechanism 102 is diagrammatically indicated and may be of any known conventional type and is designed so that in the engaged position the connecting shaft 100 is engaged to the main drive shaft 18 and both shafts will rotate at the same rate. When the clutch mechanism 102 is in the disengaged position, the connecting shaft 100 is independently rotatable in respect to the main drive shaft 18.

The crank mechanism 104 is operable to manually rotate the connecting shaft 100 when the clutch mechanism 102 is in a disengaged position. A conventional crank mechanism is shown in Fig. 5 and comprises a bevel gear 114 secured to the connecting shaft end portion 110 and a second bevel gear 116 secured to a rotatable crank shaft 118. The crank shaft 118 has a rectangular end portion 120 which is adapted to receive a crank that is not shown. Thus with the clutch mechanism 102 disengaged, rotation of the shaft 118 will be transmitted to the externally threaded shafts 80 in the rotary cutting head arms 24 and 26 by means of the gears 116 and 114, the connecting shaft 100 and the gears 112 and 94.

The main rotary drive shaft has a spur gear 122 splined thereon and is rotatably driven through a pinion gear 124 on shaft 126 which is connected to a suitable drive means which is not shown. Thus power is transmitted from the drive means through shaft 126, gears 124 and 122 to rotate the drive shaft 18 which in turn rotates the rotary cutting head 16.

In operation with the clutch mechanism 102 in the engaged position, the connecting shaft 100 will rotate at the same rate as the main drive shaft 18 and since the rotary cutting head 16 is non-rotatably secured to the drive shaft 18, for each revolution of the drive shaft 18 the rotary cutting head 16 will complete a revolution. Also, for each revolution of the drive shaft 18 the connecting shaft 100 will complete a revolution. The bevel gears 112 and 94 thus compensate for the rotation of the drive shaft 18 and the rotation of the rotary cutting head 16; hence the gears 112 and 94 do not rotate with respect to each other so that the sleeve portions 66 remain at a fixed dimension from the hub portion 22.

There are several methods of retracting the sleeve 66 on the arm body portion 64. One method to retract the sleeve 66 is to continue rotating the main drive shaft 18 and disengage the clutch mechanism 102. This operation will decrease the rotation rate of the connecting shaft 100 in comparison to the rotation rate of the main drive shaft 18. This decrease will rotatively move the bevel gears 94 and in turn retract the inner threaded tube 78 on the externally threaded shaft 80 and decrease the radial dimension between the rotary cutting head sleeve 66 and the hub portion 22. Another method of retracting the sleeve 66 is to stop the rotation of the drive shaft 18, disengage the clutch mechanism 102, and rotate the connecting shaft 100 by means of a crank mechanism 104.

To extend the sleeve 66 the rotation rate of the connecting shaft 100 must exceed the rotation rate of the main drive shaft 18. There are several methods of extending the sleeves 66, a preferred method being the rotation of the connecting shaft 100 independently of the main drive shaft 18 by disengaging the clutch mechanism 102 and employing the crank mechanism 104. It is preferable to accomplish the extension operation while the main drive shaft 18 is stationary.

From the foregoing it is seen that there is provided herein a rotary cutting head having adjustable arms capable of both radial extension and retraction, a simple positioning means, and extensible means are also provided which permit the radial extension or retraction of the arms to be accomplished both simply and quickly from a position remote to the rotary cutting head proper.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a mining machine, a rotatable drive shaft having a longitudinal passageway therethrough, a rotary cutting head having a hub portion secured adjacent one end of said drive shaft and rotatable therewith, said hub portion having a cavity therein in communication with said drive shaft passageway, an arm extending radially from the center of said hub portion, said arm having a body portion and a sleeve portion, said body portion having one end in abutting relation with said hub portion and having a longitudinal passageway in communication with said hub portion cavity, said sleeve portion being slidably positioned over the outer radial end of said body portion in spaced relation to said hub portion, cutting means extending forwardly from said sleeve portion, adjustable means within said body portion passageway having one end connected to said sleeve portion and the other end extending into said hub portion cavity, said adjustable means being arranged substantially coaxial with said arm said adjustable means being operable to move said sleeve portion longitudinally on said body portion, a second shaft rotatably positioned within said drive shaft passageway and having one end extending into said hub portion cavity, transmission means within said hub cavity connecting said second shaft to said adjustable means, and positioning means operatively connected to said second shaft and operable to actuate said adjustable means in order to vary the radial distance between said sleeve portion and said hub portion.

2. The invention as defined in claim 1 wherein said adjustable means comprises an externally threaded member and an internally threaded member, one of said members being non-rotatably secured to said sleeve and the other of said members having an end portion extending into said hub portion cavity, said members being threadably secured to each other so that upon rotative movement of said member extending into said hub portion cavity said sleeve member will slide longitudinally on said body portion.

3. The invention as defined in claim 1 wherein said positioning means comprises clutch means operable upon engagement to connect said second shaft to said drive shaft for rotation therewith thereby maintaining said sleeve portion at a fixed radial distance relative to said hub portion, said clutch means operable upon disengagement to permit rotation of said drive shaft relative to said second shaft thereby actuating said adjustable means to vary the radial distance between said sleeve portion and said hub portion.

4. In a mining machine a rotatable drive shaft having a longitudinal passageway therethrough, a rotary cutting head having a hub portion secured adjacent one end of said drive shaft and rotatable therewith, said hub portion having a cavity therein in communication with said drive shaft passageway, arms extending radially in opposite directions from the center of said hub portion, said arms each having a body portion and a sleeve portion, each of said body portions having one end in abutting relation with said hub portion and each having a longitudinal passageway in communication with said hub portion cavity, said sleeve portions being slidably positioned over the outer radial end of said respective body portions in equidistant spaced relation to said hub portion, cutting means extending forwardly from each of said sleeve portions, said sleeve portions having an internally threaded member non-rotatably secured therein substantially coaxial therewith, said internally threaded member extending into said body portion, externally threaded members positioned in each of said body portion passageways with one end threadedly secured in said internally threaded member and the other end extending into said hub portion passageway, bevel gears secured to each said last named externally threaded member end portion, a second shaft rotatably positioned within said drive shaft passageway and having one end extending into said hub portion cavity, a bevel gear secured to said second shaft end portion in operative relation with said first named bevel gears, clutch means operable upon engagement to connect said second shaft to said drive shaft for rotation therewith thereby maintaining said sleeve portions at fixed radial distances relative to said hub portion, said clutch means operable upon disengagement to permit rotation of said drive shaft relative to said second shaft thereby actuating said adjustable means to vary the radial distances between said sleeve portions and said hub portion, and mechanical means operable to rotate said connecting shaft independently of said drive shaft in order to vary the radial distance between said sleeve portions and said hub portion.

References Cited in the file of this patent

UNITED STATES PATENTS

| | | |
|---|---|---|
| 584,422 | Smith | June 15, 1897 |
| 847,801 | Moffitt | Mar. 19, 1907 |
| 1,953,402 | Graham | Apr. 3, 1934 |
| 2,730,345 | Sloane | Jan. 10, 1956 |
| 2,734,731 | Cartlidge et al. | Feb. 14, 1956 |